S. English.
Molding Tuyeres.
N°111,922. Patented Feb. 21, 1871.

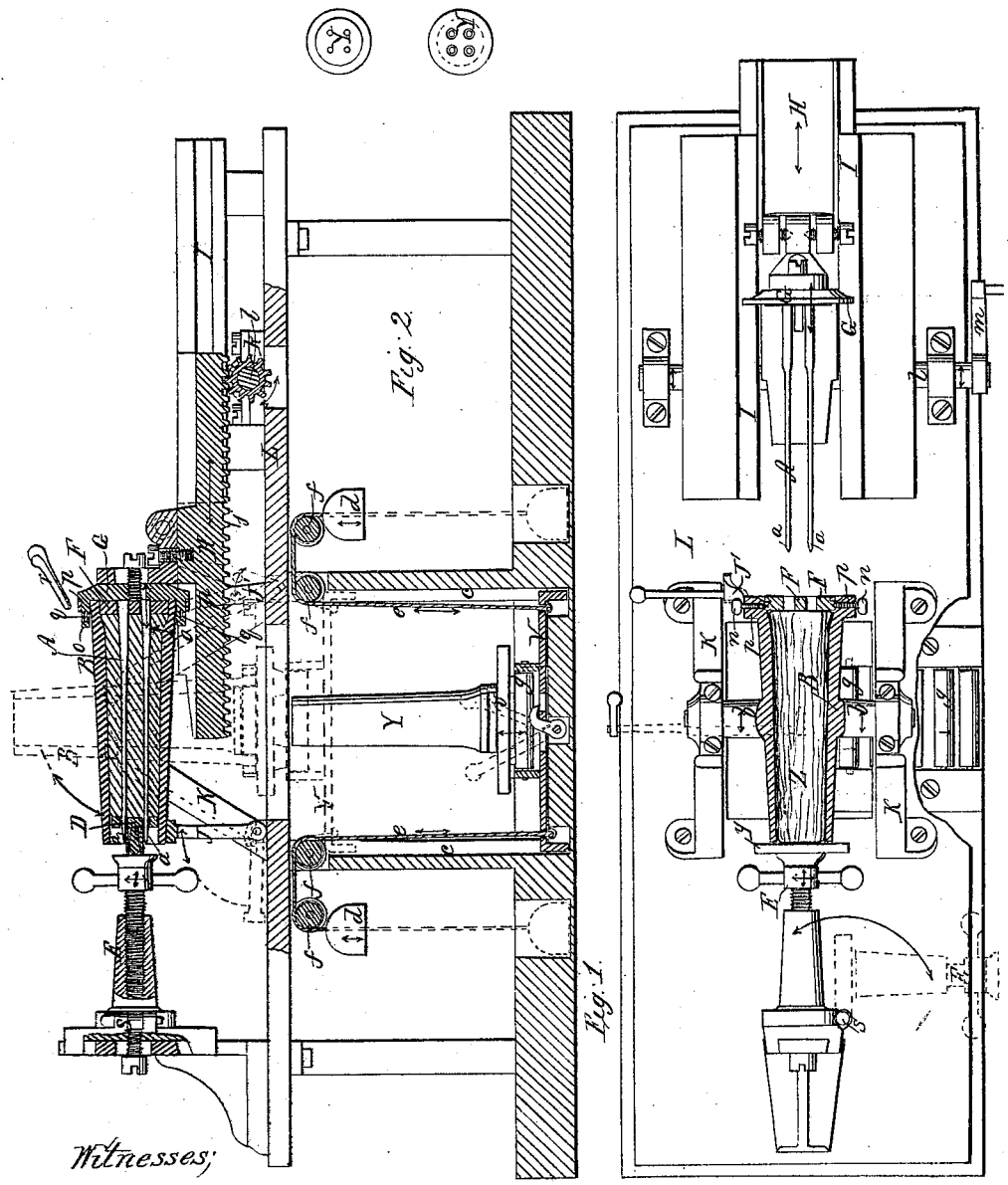

Witnesses;
F. A. Ostrander
J. K. Long

Inventor;
Samuel English

United States Patent Office.

SAMUEL ENGLISH, OF TROY, NEW YORK, ASSIGNOR TO HIMSELF AND JAMES OSTRANDER, OF SAME PLACE.

Letters Patent No. 111,922, dated February 21, 1871.

---

IMPROVEMENT IN MACHINES FOR MOLDING TUYERES.

---

The Schedule referred to in these Letters Patent and making part of the same.

---

*To all whom it may concern:*

Be it known that I, SAMUEL ENGLISH, of the city of Troy, in the county of Rensselear and State of New York, have invented a new and improved Apparatus for Molding Tuyeres for Bessemer Converters, of which the following is a specification, reference being had to the accompanying drawing, in which, on Sheet A—

Figure 1 is a plan and partial horizontal section, and

Figure 2, a central longitudinal sectional elevation of one form of my improved apparatus; and on Sheet B—

Figure 3:
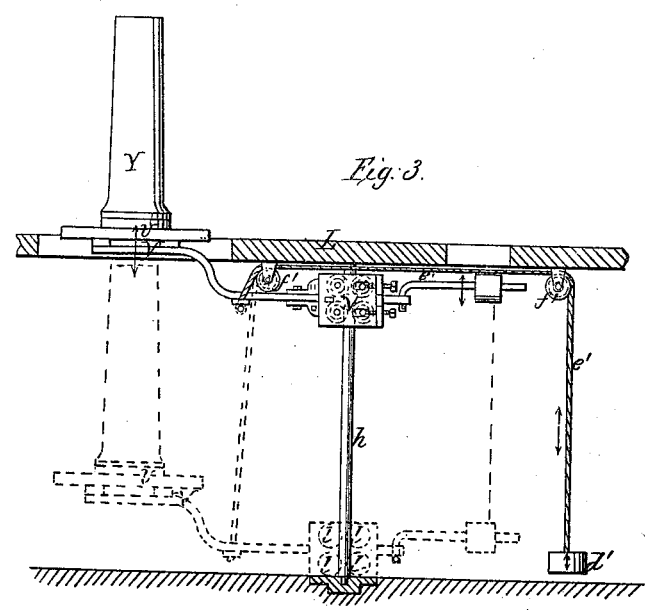

Figure 3 is an elevation, and

Figure 4:
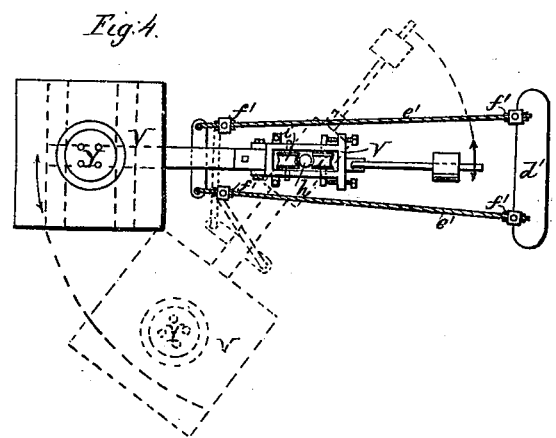

Figure 4, a top view of a modified part of the same apparatus.

Like parts are marked by the same letters in the different figures, and the arrows therein indicate the directions in which the contiguous parts are movable.

The tuyeres for discharging jets of air upward through melted cast-iron, in the converting-vessels used in the well-known Bessemer process of manufacturing iron and steel, are each of a somewhat tapering long cylindrical form, with numerous small holes lengthwise through the tuyere, and consist of a fire-clay or earthy composition molded while in a stiff, plastic condition, and afterward dried, and then burned in a kiln.

As an apparatus for use in molding the tuyeres according to the aforesaid improved method, another part of my invention consists of a suitable tapering mold, B, furnished at its small end with a suitable perforated piston, D, and a screw-press, E, or its equivalent device, for forcing the perforated piston against, and thereby compressing the plastic material around and between the core-rods in the mold, the large end of the mold being provided with a suitable head, F or G, which can be readily secured to and released from the mold, and also furnished with a suitable set of perforated core-rods, A, mounted on a stock, H, upon ways, I I, so that, by moving that stock to and fro on the ways, the core-rods will be thereby forced endwise into and withdrawn from the mold at its large end. Or, as regards this part of my invention, the core-rods A may be stationary, and the mold B, with the press-screw E or its equivalent, may be mounted and made movable on ways toward and from the core-rods, so as to thereby force the latter into and withdraw them from the mold.

In the drawing, the stock H has a rack, *j*, which gears into a pinion, *k*, fast on a shaft, *l*, which has a hand-crank, *m*, by which a person can slide that stock to and fro on the ways I I, so as to thereby force the core-rods into the plastic material in the mold, as shown in fig. 2, and so as to draw them out of the mold, as represented in fig. 1. But, instead of the rack and pinion, any other suitable or equivalent means may be used to move the core-rod stock upon the ways.

In fig. 1, the removable head F is fastened in the mold by thumb-screws, *n n*, and is perforated to allow the core-rods A to pass through it, and so as to prevent the molded tuyere from being drawn out of the mold by its adhesion to the core-rods.

In fig. 2, the head G, which holds the core-rods, has studs, *o o*, which extend through apertures in a flange or lugs, *p*, on the mold, and have transverse holes, *q*, so that, by putting keys *r* therein, the head and core-rods will be held firmly in and to the mold. But any other suitable or equivalent devices may be used to temporarily secure the head F and core-rods in the mold. And, in case the molded tuyere shall adhere stronger to the inner surface of the mold than to the core-rods and the head at the large end, the inner perforated head F need not be fastened in the mold separately from the core-rods, or it may be dispensed with, or consist of a loose perforated sheet to serve as a parting between the head G and the large end of the molded tuyere.

When the thick perforated head F shall be used, the core-rod holder G need not cover the whole large end of the mold.

A block, *y*, fig. 1, instead of the piston D, may be held in or against the small end of the mold by the pressing-screw E, while the core-rods are being forced through the material in the mold, which block is to be removed, and the plastic material dug out around the perforating-ends of the core-rods, and the latter pressed into their proper place, (in case they shall have been sprung sidewise in being forced through the plastic material,) preparatory to the placing of the perforated piston D upon the ends of the core-rods in the mold.

The material may sometimes be compressed in the mold both before and after the insertion of the core-rods, but such prior compression is commonly considered unnecessary.

Another part of my invention consists of a tuyere-mold furnished with a flexible and removable head at one end and a perforated piston at the other, and pivoted or mounted so that the mold may be turned in a vertical plane, and made flexible in relation to a set of perforating core-rods and a piston-pressing device, in such manner that a tuyere can be molded and compressed in the mold in a horizontal or somewhat-inclined position, essentially as above described, and can also be discharged from the mold in a vertical or nearly vertical direction, so as to thereby avoid liability of bending the plastic tuyere in discharging it from the mold, and so as to deliver the molded tuyere in the proper upright position in which it should be dried.

In the drawing, the mold B is supported by trunnions, b b, on standards K K, fast on the bed-plate L; and J J' are hinged stops for temporarily holding the mold in its proper molding-position in respect to the core-rods A and pressing-screw F.

Another part of my invention consists in the arrangement, in connection with a pivoted mold furnished with devices for molding tuyeres from plastic materials, essentially as above described, of a counter-weighted, vertically movable platform, V, in such manner that, when the pivoted mold with the molded tuyere therein shall be turned into the proper vertical position and the tuyere there discharged from the mold, the tuyere may be received in an upright position by and upon the said counter-weighted platform, and thereby supported and maintained in the proper upright position while being delivered and removed from the pivoted mold.

In fig. 2 the platform V is made to slide up and down in ways, c c, and has counter-weights, d d, attached by cords, e e, passing over fixed pulleys, f f; and g g are rollers, upon which the molded tuyere Y, when resting on an intervening block or blocks, v, can be easily moved laterally, by hand, from the platform V when the latter is depressed, as shown in fig. 2.

In figs. 3 and 4 the platform V has a counter-weight, d', secured by cords e' e', passing over fixed pulleys f' f', and is made to move up and down on a round rod, h, to which the platform is connected by grooved rollers i i, so that the platform, when depressed with the molded tuyere Y thereon, as shown by dotted lines in fig. 3, can be turned laterally on the rod h, as indicated by dotted lines in fig. 4, for convenience in removing the tuyere from the platform by hand.

In molding a tuyere by means of the apparatus represented in the aforesaid drawing, the core-rods A are first drawn out of the mold B, as shown in fig. 1, and the screw E is turned, on its pivot s, away from the mold, as shown by dotted lines in the same figure, and the head F and piston D are taken out of the mold.

Then the mold B is turned on its trunnions b b so that its largest end is uppermost, and a mass of the stiff plastic material Z, fig. 1, sufficient for a tuyere and of nearly the shape of the interior of the mold, is put into the latter at its large upper end, the small end of the mold being then covered by a plate, y.

Then the mold is turned into its horizontal position and secured there by the hinged stops J J', and the plate y is held fast against the small end of the mold by the screw E, and the perforated head F is inserted and fastened, by screws n n, in the large end of the mold, all as shown in fig. 1.

Then the pointed core-rods A are forced through the holes in the head F, and through the mass of plastic material Z in the mold, and are made fast therein by the keys r, fig. 2.

Next, the screw E is loosened and turned back, the plate y is removed, the plastic material is dug out from around the pointed ends of the core-rods, and the perforated follower D is placed within the small end of the mold with the ends of the core-rods in the holes through the follower.

Then the follower D is pressed into the mold B with great force by the screw E, so as to thereby make the stiff plastic material fill every part of the mold, and at the same time cause the tuyere to be somewhat more compact and durable at and toward its small end, which in use is most exposed to the destructive action of the ignited metal in the converting-vessel than at and toward its large end, which is not thus exposed to destruction in use.

Then the core-rods A and screw E are withdrawn from the mold, the head F is taken out of the mold, and a block, v, fig. 2, put in its place.

The stops J J' are removed, and the mold B is turned on its trunnions into a vertical position with its large end downward, as shown by dotted lines in fig. 2, whereupon the platform V is permitted to rise to the mold and then allowed to descend with the large end of the molded tuyere Y resting upon the block v on the platform, as indicated in figs. 2 or 3.

I am aware that it has been proposed to mold tapering bodies of plastic material with a series of longitudinal perforations through the same, by forcing a series of pointed core-rods endwise through a mass of the plastic material in a mold having opposite perforated ends, through which the core-rods were inserted and extended when forced into the mold, (see English Letters Patent No. 14,212, A. D. 1852;) but I am not aware that in any such case a perforated follower has been inserted in the mold and over and around the pointed ends of the core-rods therein, and forced inward like a piston within the mold and along the core-rods, so as to thereby further compress and consolidate the plastic material in the mold and against the core-rods after the latter were inserted in the mold to their fullest extent; and such additional compression as is given by the piston-like follower D in my above-described apparatus is of much importance in molding the tuyeres from the very stiff plastic material that is commonly used for such articles.

The mounting of the mold B on horizontal trunnions or pivots b b, so that it can be turned with its large end upward to receive the crude mass of plastic material, and then set in a horizontal position to receive the action of the horizontally-operating molding devices, and afterward released and turned so as to discharge the tuyere downward in the proper vertical direction without interference from the molding devices, is of much importance in my above-described apparatus; and I am not aware that a mold has been thus mounted on pivots or trunnions in any apparatus heretofore used for molding tuyeres or similar perforated articles.

A vertically-movable counter-weighted platform is not new, and it has been used to receive and lower endwise tubular articles of plastic material, as such articles were formed by being exuded from a die by molding or pressing devices operating in a vertical mold; but the combination of the counter-weighted vertically-movable platform V, with the tapering mold B on horizontal pivots, and furnished with the detachable horizontally-operating devices for molding the tuyeres as above described, is of much importance in the manufacture of such long tapering articles with numerous small longitudinal perforations, which articles cannot be molded by the apparatus with which the vertically-movable platform has been heretofore combined.

What I claim as my invention, and desire to secure by Letters Patent, is—

1. The combination, with the tapering mold B, of two or more pointed parallel core-rods A, the removable head F G at the large end of the mold, the removable piston or follower D, fig. 2, perforated to receive and support the slender core-rods, and fitted to slide within the small end portion of the mold, and the screw E for moving the piston or follower in the mold, substantially as described.

2. The combination of the horizontally-operating pointed core-rods A and pressing-screw E with the mold B, furnished with the removable head F G and follower D, and mounted on horizontal trunnions $b\ b$, and provided with the movable stops J J', or their equivalent, substantially as described.

3. The arrangement of the vertically-movable counter-weighted platform V, in combination with the mold B, mounted on horizontal pivots $b\ b$, and furnished with stops J J', removable head F G, piston or follower D, and the horizontally-operating pointed core-rods A, and screw E, or its equivalent, substantially as described.

In testimony whereof I hereunto set my hand, at Troy, New York, this 2d day of December, 1869.

SAMUEL ENGLISH.

Witnesses:
F. A. OSTRANDER,
J. K. LONG.